(12) United States Patent
Gaudron

(10) Patent No.: US 6,419,436 B1
(45) Date of Patent: Jul. 16, 2002

(54) AUGER-LIKE DRYWALL SCREW

(75) Inventor: Paul Gaudron, Stamford, CT (US)

(73) Assignee: Power Products III, LLC, New Rochelle, NY (US)

( * ) Notice: Subject to any disclaimer, the term of this patent is extended or adjusted under 35 U.S.C. 154(b) by 0 days.

(21) Appl. No.: 09/634,428

(22) Filed: Aug. 8, 2000

(51) Int. Cl.⁷ .............................................. F16B 35/04
(52) U.S. Cl. ...................... 411/426; 411/411; 411/424
(58) Field of Search ............................... 411/386, 411, 411/412, 414, 424, 426

(56) References Cited

U.S. PATENT DOCUMENTS

| | | | | |
|---|---|---|---|---|
| 516,134 A | * | 6/1894 | Stilwell | 411/426 X |
| 984,969 A | * | 2/1911 | Reiniger | 411/426 |
| 4,892,429 A | * | 1/1990 | Giannuzzi | 411/426 X |
| 5,059,077 A | * | 10/1991 | Schmid | 411/426 X |
| 5,226,766 A | * | 7/1993 | Lasner | 411/426 X |
| 6,264,677 B1 | * | 7/2001 | Simon et al. | 411/426 X |

* cited by examiner

*Primary Examiner*—Neill Wilson
(74) *Attorney, Agent, or Firm*—Morgan, Lewis & Bockius LLP

(57) ABSTRACT

The present invention relates to a novel screw for use with dry wall and for hanging articles therefrom. This invention provides a screw with a head adapted for engagement with a driving tool, a shank whose diameter decreases from the head to a distal end, and a helical thread with a pitch diameter of at least about twice the largest minimum diameter of the shank. The thread including a geometry of an auger.

11 Claims, 2 Drawing Sheets

AUGER-LIKE DRYWALL SCREW

BACKGROUND OF THE INVENTION

1. Field of the Invention

This invention relates to a novel screw for use with dry wall (gypsum plasterboard, Sheetrock, etc.) for the homeowner in hanging articles therefrom.

2. The State of the Art

Screws have existed for many years and are based on the principle of the inclined plane providing a wedging action to force the head of the screw into the substrate. Different screws have been developed for different materials, principally for wood and sheet metal, but also for dry wall. A typical dry wall screw has a body of a constant diameter and a thread designed to cut into both the dry wall and the fixture to which it is support (often a metal stud).

Homeowners typically hang pictures, shelves, plants, and other devices or decoration from their interior walls. Devices such as picture hangers typically use a nail and a fulcrum device; the nail can easily come out of the wall or it may tear through the Sheetrock. Larger fastening devices can be unsightly and are likely oversized for the job at hand, such as hanging a picture.

What is needed is a small screw with the holding power of a larger screw, which can be removed, and which does not degrade the dry wall significantly when removed.

SUMMARY AND OBJECTS OF THE INVENTION

One object of this invention is to provide a relatively small screw with improved holding power for use in dry wall. Another object is to provide such a screw that can be removed easily with destroying or degrading the dry wall.

These and other objects of the invention are achieved by providing a screw having a tapered shank and a thread having a diameter and a pitch greater than the minor diameter, and a head adapted for being driven by a tool. In essence, one can envision this screw as a corkscrew having a typical screw head.

DETAILED DESCRIPTION OF SPECIFIC EMBODIMENTS

Figure 1A:
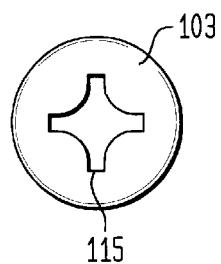
FIGS. 1A, 1B, and 1C are, respectively, top, side, and bottom views of the screw.
Figure 1B:
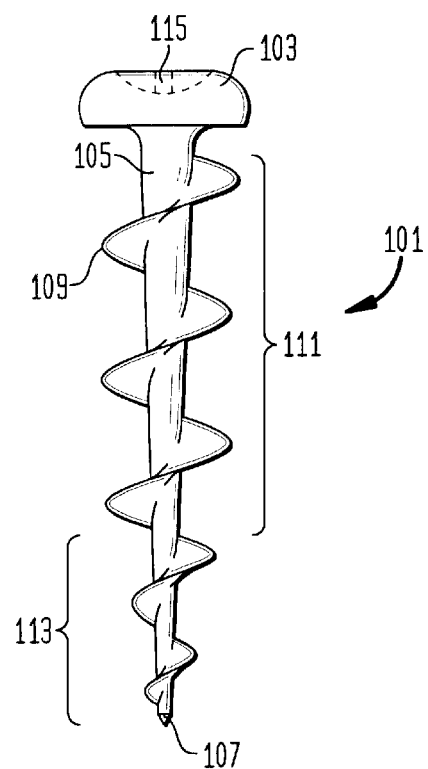
Figure 1C:
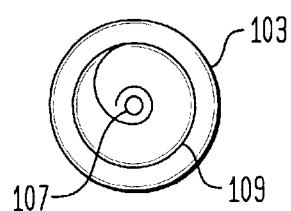

With reference to FIG. 1B is seen an idealized side view of the novel screw 101 having a head 103 from which depends a shank 105 that tapers to the tip 107, the taper being largest at the head and becoming smaller towards the tip. Disposed on the shank is a helical thread 109 having the geometry of an auger. For the main portion of the thread 111 the pitch diameter is constant, like a machine screw. For the bottom portion of the thread 113, the pitch diameter tapers like a wood screw. FIG. 1A is a top view showing the head 103 and a cavity 115 adapted for receiving a Phillips-type screw driver, although it should be understood that any type of driver cavity is suitable. FIG. 1C is a bottom view.

The advantage of this novel screw is that the thread is much wider than the shank, thereby providing a large surface area for cutting into dry wall. The large thread (compared with the shank diameter) provides significant pull-out resistance and holding power. It is preferred that the pitch diameter be at least about twice the shank (minor) diameter at the shank's widest point. Because the shank is tapered, the pitch diameter in the main portion becomes about four times the shank diameter.

The reduced diameter shank leaves only a relatively small hole when the screw is removed.

The bottom portion of the thread had a reduced pitch diameter, although the pitch is relatively constant. This reduced pitch diameter allows the screw to be started easily in dry wall, effectively providing a tap.

Figure 2A:
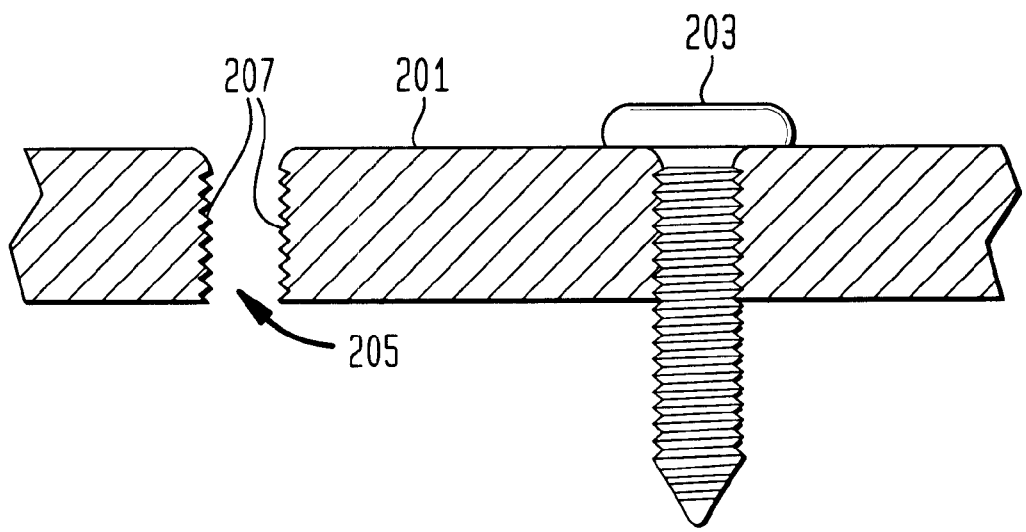
FIGS. 2A and 2B are idealized cross sectional views of a conventional screw and the instant screw, respectively, in dry wall and the holes made by each when removed.
Figure 2B:
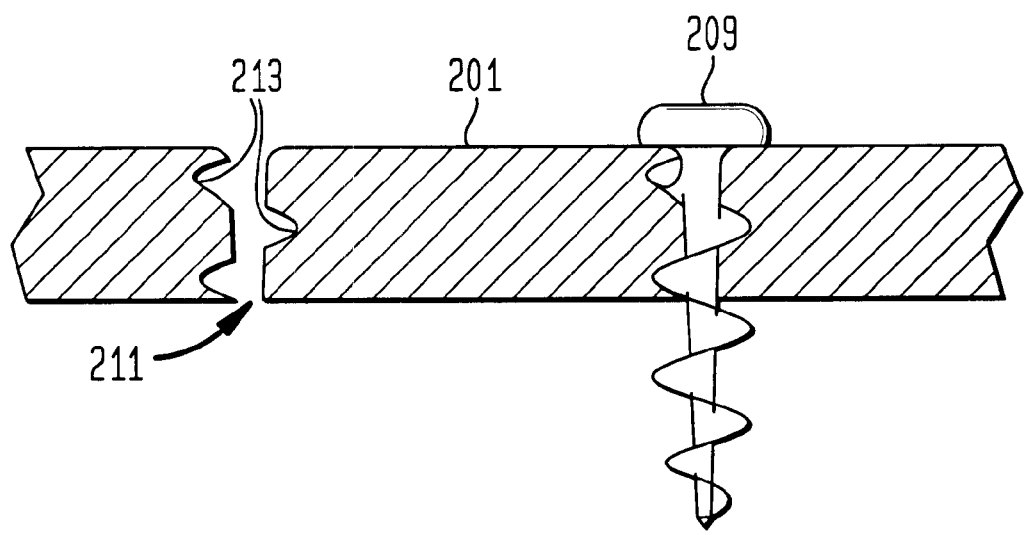

FIG. 2A shows a cross section of a sheet of dry wall 201 in which a conventional screw 203 has been driven. When the screw is removed it leaves a hole or bore 205 in which the portions 207 of the dry wall engaged by the screw are seen to be quite small in relation to the bore. In contrast, in FIG. 2B shows a similar cross section of a sheet of dry wall 201 in which the instant auger screw 203 has been driven. When the novel screw is removed, the bore 211 revealed is relatively smaller and thus more cosmetically appealing for repair. Also, the portions 213 of the dry wall engaged by the auger are relatively larger than those left by the conventional screw. It can also be seen that the portions 213 engage more surface area than those of the conventional screw, thus providing improved holding.

In addition, the comparison of FIGS. 2A and 2B shows why the present invention is an improvement over existing screws. The holding power of the screw is related to the amount of substrate material held between each turn of the thread, the number of threads, and the intrinsic strength of the substrate material. Gypsum dry wall, because of its frangible nature, requires a relatively large thickness to be strong (a dry wall screw is useful only in holding the dry wall to another substrate). The relatively fine threads of a typical screw (FIG. 2A) do not allow for a sufficient amount of material therebetween, especially because the dry wall substrate is a rather frangible material. On the other hand, the present screw holds relatively large amount of material between one pitch revolution; as shown in FIG. 2B, about one-half of the thickness of the wall is held between a single turn of the thread.

This screw essentially slices into the wall and has a relatively small shank diameter compared with the major diameter. Thus, less of the dry wall is destroyed when the screw is driven, and so when the screw is removed there is a much smaller hole to repair than with a conventional screw. The ratio of the major to minor diameters, and independently thereof the ratio of the major diameter to the pitch, is preferably at least about 1.5:1, more preferably at least about 1.75:1, and most preferably about 2:1 or more. In the screw shown in FIG. 1B, exemplary dimensions are 0.33 inch for the major diameter and for the pitch, and 0.14 inch for the minor diameter; at the bottom portion where the shank is tapered, the diameter of the tip is about 0.04 inch.

While the novel screw has been shown with a Philips-type head, the head can have a structure adapted to engage a flat head screw driver or a hex or square driver, or the head can be a hex head like a bolt, especially for hanging shelving and the like which are relatively heavy objects. Also, the head can be replaced with a hook or similar device to function as a picture hanger. Also, while a single auger is shown, a double auger thread can be used.

The instant auger screw is preferably made of metal, but could be made from a hard plastic as well.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. An auger-like screw for use with dry wall, comprising:
   a. a head portion, adapted to be engaged by a driving tool;
   b. a shank portion, having a proximal end and a free distal end, wherein said proximal end is attached to said head portion, and said shank portion having a decrease in diameter from said proximal end to said free distal end; and
   c. a helical thread, with a geometry of an auger, having an outside diameter to shank diameter ratio of at least 2 to 1, and wherein said helical thread has a constant outside diameter for a substantial portion along the length of said shank.

2. The auger-like screw of claim 1, wherein said helical thread is spaced at intervals of approximately 0.5 to 1.0 cm.

3. The auger-like screw of claim 2, wherein said helical thread is spaced at intervals of approximately 0.8 cm.

4. The auger-like screw of claim 1, wherein said ratio is approximately 2.5 to 1.

5. A screw for use with dry wall, comprising:
   a. a head, adapted to be engaged by a driving tool;
   b. a thin shank with a slight taper, having a proximal end and a free distal end, wherein said proximal end is attached to said head, and said shank having a decrease in diameter from said proximal end to said free distal end; and
   c. a helical thread, with a geometry of an auger, having an outside diameter to shank diameter ratio of at least 2 to 1, and wherein said helical thread has a constant outside diameter for a substantial portion along the length of said shank.

6. A screw comprising:

a head, optionally adapted to be engaged by a driving tool;

a shank attached to the head and having a free distal end, the shank being tapered to decrease in diameter from the head to the distal end; and a helical thread in the geometry of an auger having a pitch diameter of at least about twice the largest minimum diameter of the shank.

7. The screw of claim 6, wherein the thread has a first portion of constant diameter.

8. The screw of claim 7, wherein the thread has a second portion associated with the distal end wherein the pitch diameter lessens.

9. The screw of claim 6, comprised of metal.

10. The screw of claim 6, comprised of plastic.

11. The screw of claim 6, wherein the head is adapted to be engaged by a screwdriver.

* * * * *